United States Patent [19]

Heinen et al.

[11] 4,256,705

[45] Mar. 17, 1981

[54] LEACHING AGGLOMERATED GOLD - SILVER ORES

[75] Inventors: Harold J. Heinen, Reno; Gene E. McClelland, Sparks; Roald E. Lindstrom, Reno, all of Nev.

[73] Assignee: The United States of America as represented by the Secretary of the Interior, Washington, D.C.

[21] Appl. No.: 141,087

[22] Filed: Apr. 17, 1980

Related U.S. Application Data

[63] Continuation-in-part of Ser. No. 29,953, Apr. 13, 1979, abandoned.

[51] Int. Cl.$^3$ ............................ C01G 5/00; C01G 7/00
[52] U.S. Cl. .......................................... 423/27; 423/29; 75/3; 75/101 R; 75/105; 75/118 R
[58] Field of Search ................ 423/27, 29; 75/101 R, 75/105, 106, 118, 3

[56] References Cited

U.S. PATENT DOCUMENTS

| | | | |
|---|---|---|---|
| 588,476 | 8/1897 | Rhodes | 423/27 |
| 658,938 | 10/1900 | Alzugary | 75/105 |
| 868,551 | 10/1907 | Hall | 75/105 |
| 2,009,667 | 7/1935 | Keyes | 423/29 |

FOREIGN PATENT DOCUMENTS 517867  2/1940  United Kingdom ........................ 75/3

OTHER PUBLICATIONS

*Chemical Abstracts*, vol. 68, No. 97,730c (1968).

*Primary Examiner*—Brian E. Hearn
*Attorney, Agent, or Firm*—William S. Brown; Donald A. Gardiner

[57] ABSTRACT

Percolation leaching of gold or silver ores, tailings or wastes is accomplished by a process comprising initial agglomeration of fines in the feed by means of a binding agent and water, followed by aging and, subsequently, leaching to recover gold or silver values.

7 Claims, No Drawings

LEACHING AGGLOMERATED GOLD - SILVER ORES

This application is a continuation-in-part of application Ser. No. 29,953, filed Apr. 13, 1979, now abandoned.

Conventional percolation leaching, particularly heap leaching, has generally proven to be a low-capital, low-operating cost technique for processing low-grade gold or silver ores, tailings or wastes. However, many such materials are not amenable to existing percolation leaching processes because of the presence of excessive amounts of clays, or of fines generated during crushing of the feed materials. These constituents in the feed impede uniform flow of leach solution through the feed beds, causing channeling and reducing precious metal recovery. In the mineral processing field, slimes are generally defined as the fraction of an ore that is too fine to be commercialy exploited by processes developed for the coarser size fractions. Frequently slimes are considered to be particles less than 50 microns in diameter. Slimes are present in most ores and mill feeds because of (1) weathering, physical abrasion, and alterations of certain rock components, and (2) the comminution of the ore to achieve liberation of the valuable mineral constituents. In prevailing heap leach cyanidation practices, the presence of slimes (clays and/or ore fines) in the feed materials impede uniform solution flow through the ore mass and channeling results which reduces precious metal extraction. In extreme cases the presence of clays can completely seal the ore heap causing the leach solution to run off the sides of the heap rather than penetrate the ore. Because prevailing technology is inadequate to handel the slime problem in heap leach cyanidation, many of the low-grade clayey gold and silver deposits cannot be exploited.

It has now been found, according to the process of the invention, that the efficiency of percolation leaching processes for recovery of gold or silver from such feed materials may be substantially improved by initial pretreatment of the feed with a binding agent and water to agglomerate fines contained in the feed, followed by aging of the thus-treated feed. The pretreated feed may then be subjected to conventional percolation leaching techniques to recover gold or silver values.

More specifically, the invention relates to a process involving the steps of (1) mixing the feed with a binding agent, (2) wetting the feed-binding agent mixture uniformly with a closely controlled amount of water, (3) mechanically manipulating the wetted material to effect agglomeration of fines contained in the feed, (4) aging the thus-treated feed at ambient conditions until the agglomerates have set up and developed sufficient green strength to withstand further wetting without disintegration, and (5) subjecting the pretreated feed to conventional percolation leaching for extraction of gold or silver values. This pretreatment of the feed increases its porosity and permeability, thus enhancing the percolation flow of leach solutions through beds or heaps of the gold or silver-containing feed. Both the speed and extraction efficiency of the leaching process is thereby substantially improved. In addition, the amount of residual leach solution, specifically cyanide, in the spent feed is reduced.

Burnt lime, i.e., calcium oxide, and type II portland cement have been found to be particularly effective as binding agents in the process of the invention. However, other binding agents, such as calcium aluminate cement, magnesia, dolomite, inorganic silicates, and organic long chained polymers, may also be used. In addition, other types of lime, such as hydrated and agricultural lime, and other varieties of portland cement may also be used as the binding agent. Particular combinations of these binding agents may also be effective for treatment of specific feed materials.

Flocculating agents, including lime, have been widely employed in thickening and dewatering applications, such as dewatering ore pulps, and briquetting or pelletizing finely ground concentrates into larger particular suitable for heat hardening prior to charging to an open hearth or blast furnace. The primary purpose of such procedures is production of briquettes or pellets that do not spall during thermal induration. In contrast, the objective of applicants' invention was conversion of fines in feed materials to porous agglomerates having sufficient green strength to withstand percolation leaching. Lime is also frequently used to provide protective alkalinity in conventional cyanide heap leaching. However, its use in this manner has little beneficial effect on the percolation flow through ore beds.

In the process of the invention, the feed is throughly mixed with a small amount of the binding agent, and the mixture is then wetted with an amount of water sufficient to cause substantial binding or agglomeration of fines in the feed when the mixture is cured or aged for a suitable period of time. Optimum amounts of binding agent and water will vary with the type of feed and specific binding agent employed. However, suitable amounts of binding agent will usually be in the range of about 5 to 15 pounds per ton of feed, with the amount of water generally being in the range of about 8 to 16 weight percent based on the amount of feed. Close control of the amount of water has, however, been found to be generally desirable since best results are usually obtained only when a particular amount of water is used in the agglomeration process. Since, however, the optimum amount of water may vary considerably with different feed materials and binding agents, this amount is best determined experimentally. By proper control of the quantity of binding agent and water, only the fines are agglomerated, leaving the coarser fragments of the feed material relatively uneffected. This results in a granular, popcorn-like product of substantially increased porosity and permeability.

The water may be added and admixed with the feed-binding agent mixture by any conventional means such as a pelletizer or balling machine. Agglomeration of fines in the resulting admixture is also accomplished by conventional mechanical means such as the use of a rotating disk pelletizer or balling machine to produce agglomerates, pellets, or balls. Generally, admixture of the feed-binding agent mixture with water, and agglomeration, may be effected simultaneously by means of such mechanical devices. Although this procedure for preparation of the wetted feed-binding agent mixture is generally preferred, other methods, such as spraying an aqueous slurry of the binding agent onto the dry feed, may also be used.

The resulting material is then aged or cured, without drying, at ambient conditions for a period of time sufficient to cause the agglomerates to set up and develop sufficient green strength to withstand further wetting without disintegration. Although optimum aging time may also vary considerably with specific feed material and binding agent, suitable times will usually fall within the range of about 5 to 72 hours. Use of appropriate accelerators, particularly where the binding agent is cement, may, however, reduce the required aging considerably. Again, however, the time of aging has been found to be important to achievement of best results and optimum aging time should, therefore, be determined experimentally in each case.

Leaching of the thus-pretreated feed to extract gold or silver values is accomplished by conventional percolation leaching procedures. Such procedures consist of percolation of leach solution, generally cyanide solution, through a body of the feed material in order to extract gold or silver values by formation of cyanide complexes of the metals. Details of such procedures are well known in the art and do not constitute an essential aspect of the invention. A detailed description of heap leaching of gold ores, e.g., is given in Bureau of Mines Information Circular 8770, 1978.

The invention, and the advantages thereof, will now be more specifically illustrated by the following examples. The percolation leach tests of these examples were conducted on 50-lb charges of feed material in a plexiglass column 5 feet high with an inside diameter of 5.5 inches to make a bed about 4 feet in height. Twelve liters of leach solution containing 2 lb of NaCN per ton was employed. After bedding the feed material in the leach column, downward directed percolation leaching was initiated. The pregnant liquor was collected in a sump, pumped upward through activated carbon for silver-gold recovery and the resulting barren solution was returned to the top of the leach column. The leach solution was circulated through the leaching-carbon adsorption system until a steady-state flow rate had been achieved. Flow rate measurements were taken daily for a period of one week, and averaged to determine the percolation flow rate.

EXAMPLE 1

The feed material used in this example, as well as in examples 2 and 3, was minus 20-mesh silver mill tailings containing quartz, sodium-potassium feldspars, biotite, surface carbonates, and a small amount of clays. The silver content was 2.8 ounces/ton. Approximately 30 wt-pct of the feed was minus 100-mesh fines, comparatively low in clayey constituents.

A series of percolation leach tests was conducted on the silver mill tailings to obtain baseline flow rate data on untreated feed for comparison with data obtained in subsequent agglomeration test. Various amounts of burnt lime, ranging from 0 to 15 lb/ton of feed, were mixed into 50-lb charges of tailings to provide protective alkalinity during cyanidation and determine the effect of adding lime without agglomerating the fines. Experimental results indicated that the flow rate remained constant at 0.5 gal/hr/ft$^2$ of cross sectional area and was independent of the amount of lime mixed into the feed.

EXAMPLE 2

A series of tests were conducted on the silver tailings to determine the effects of agglomeration pretreatment with lime percolation flow rate. The test procedure was as follows: The dry tailings and lime, in amounts of 5 and 10 pounds per ton of feed, were thoroughly mixed. Then the mixture was uniformly moistened and agglomerated on a rotating pelletizer with 9 wt-pct water, and the agglomerates allowed to cure without drying at ambient conditions in an open vessel for 24 hours. The cured mixture was then transferred to the leach column, and downward directed percolation leaching with sodium cyanide solution was initiated. The flow rates obtained using 5 and 10 lb of CaO per ton of feed were 6 and 8.5 gal/hr/ft$^2$, respectively, thus exceeding the rate typically achieved in commercial heap leach cyanidation operations when treating readily leachable gold-silver ores, i.e., about 3 gal/hr/ft$^2$. These results show that the agglomeration pretreatment with lime markedly improves the percolation flow rate.

EXAMPLE 3

A series of tests were conducted to investigate the effect of curing time on the percolation flow rate. Charges of the silver-bearing tailings were mixed with 5 lb of lime per ton of feed followed by agglomeration treatment using 9 wt-pct water. The agglomerated charges were cured, as in Example 2, at ambient temperature without drying for various times. Retention periods investigated were 0, 5, 20, 24, 48 and 72 hours. The results showed that no improvement in percolation flow rate resulted from leaching freshly prepared agglomerated feed, but the percolation flow rate improved markedly with increasing curing time up to 20 hours, where flow rate was about 5 gal/hr/ft$^2$, and then more slowly with curing time up to about 72 hours, where the flow rate was about 8.8 gal/hr/ft$^2$. Curing for a period of 24 hours resulted in a flow rate of 6 gal/hr/ft$^2$, a 12-fold increase in percolation rate over that obtained without preliminary treatment. Thus, the data show that the curing time is a key operating parameter in the process of the invention.

Optimum conditions for fine particle agglomeration of the feed of the above examples was found to be about 5 to 10 lb of CaO/ton of feed, about 9 to 11 wt-pct moisture content and about 24 to 48 hours curing time. Under these conditions, the agglomeration pretreatment increased the percolation rate from 0.5 to 7 gal/hr/ft$^2$, and the silver recovery by percolation leaching was 45 pct, equal to that obtained by conventional agitation cyanide leaching. As discussed above, however, optimum conditions for treatment of specific feed materials may differ markedly and are, therefore, best determined experimentally.

EXAMPLE 4

In this example, and the following examples, the feed material consisted of a clayey gold ore containing 0.09 oz of Au/ton. The ore was an altered igneous rock containing quartz, feldspar, altered biotite, epidote, clays, and earthy iron oxides. The minus 100 mesh fines represented 30 pct of the $\frac{3}{8}$" feed by weight. The procedures were similar to those of Example 1-3. The results of the series of tests of this example also showed that the amount of lime mixed into the ore without a pretreatment step had very little effect on the percolation flow rate. The flow rates obtained employing 0, 5, 10 and 15 lbs of lime/ton of ore were consistently poor at 0.1 gal/hr/ft$^2$.

EXAMPLE 5

In this example, the effect of lime employed in the agglomeration pretreatment on the subsequent percolation flow rate of leach solution was studied by means of a series of tests employing 5, 10 and 15 lbs of lime/ton of ore. The ore-lime mixture was uniformly wetted and the fines agglomerated on a rotating pelletizer using 16 wt-pct water. The treated material was cured in a closed percolation leach column for 72 hours at ambient temperature to permit the agglomerates to develop sufficient green strength to withstand leaching without disintegration. Another objective was to study the effect of eliminating adsorption of atmospheric carbon dioxide by the lime. Percolation flow rates resulting from use of 5, 10 and 15 lbs of lime/ton of ore in the agglomeration pretreatment were, respectively 2.8, 6.9 and 11.4 gal/hr/ft$^2$, thus showing marked increase in flow rate resulting from the agglomeration pretreatment.

EXAMPLE 6

In this example, portland cement was evaluated as a binding agent in the process of the invention. The cement was used instead of lime for agglomerating fines in the clayey gold ore of examples 4 and 5. The test procedure was the same as that of example 5. Percolation flow rates obtained using 5, 10, and 15 lb of portland cement, type II/ton of ore were, respectively 3.7, 21 and 21 gal/hr/ft$^2$. Thus, the portland cement was even more effective, weight-wise, than lime in the process of the invention. In addition, it was found that the portland cement formed more rigid agglomerates which still exhibit high porosity and are readily amenable to percolation cyanidation.

The leached products from the above tests of this example were further treated by a simulated vat leaching technique to determine their stability under flooding conditions. The charges of pretreated feed were submerged in standard cyanide leach solutions for 24 hours and then drained. This leaching sequence was repeated five times. The ore with fines agglomerated with the cement additive showed very little, if any, deterioration or disintegration of the glomerules. These tests demonstrated that portland cement produces stable agglomerates which can readily withstand percolation cyanide leaching using either the trickle or flooding method.

About 75 percent of the total gold was recovered by cyanide leaching of the pretreated gold ore in all of the tests of example 4–6. This extraction was comparable to that achieved by conventional agitation-cyanidation techniques.

We claim:

1. A process for percolation leaching of gold or silver values from a feed material consisting of ores, tailings or wastes comprising:
   (1) admixing the feed with about 0.25 to 0.75 weight percent of a binding agent consisting of lime, portland cement, or mixtures thereof, and about 8 to 16 weight percent of water,
   (2) mechanically manipulating the admixture to effect agglomeration of fines in the feed,
   (3) aging the admixture at ambient conditions for a time sufficient to provide the resulting agglomerates with green strength sufficient to withstand further wetting without disintegration, and
   (4) subjecting the aged admixture to percolation leaching with a leach solution for gold or silver.

2. The process of claim 1 in which the feed material is a low-grade clayey gold or silver ore, tailing or waste.

3. The process of claim 2 in which the binding agent is portland cement.

4. The process of claim 1 in which the aging time is about 5 to 72 hours.

5. The process of claim 1 in which the leach solution is a cyanide solution.

6. The process of claim 1 in which the percolation leaching consists of heap leaching.

7. The process of claim 1 in which the percolation leaching consists of vat of flood leaching.

* * * * *